（12） United States Patent
Parvarandeh

(10) Patent No.: US 11,199,454 B2
(45) Date of Patent: Dec. 14, 2021

(54) HEAT IMAGING THERMOPHILE DEVICE AND METHOD

(71) Applicant: Maxim Integrated Products, Inc., San Jose, CA (US)

(72) Inventor: Pirooz Parvarandeh, Los Altos Hills, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 337 days.

(21) Appl. No.: 15/080,823

(22) Filed: Mar. 25, 2016

(65) Prior Publication Data

US 2016/0265977 A1 Sep. 15, 2016

Related U.S. Application Data

(63) Continuation-in-part of application No. 14/810,073, filed on Jul. 27, 2015, now Pat. No. 11,067,452.
(Continued)

(51) Int. Cl.
*G01J 5/12* (2006.01)
*G01J 5/02* (2006.01)
(Continued)

(52) U.S. Cl.
CPC .............. *G01J 5/12* (2013.01); *G01J 5/0275* (2013.01); *G01J 5/0896* (2013.01); *G01J 2005/0077* (2013.01)

(58) Field of Classification Search
CPC .......... G01J 5/12; G01J 5/0275; G01J 5/0896; G01J 2005/0077; G01J 5/025;
(Continued)

(56) References Cited

U.S. PATENT DOCUMENTS

| 4,343,182 A | 8/1982 | Pompei |
| 6,297,511 B1 | 10/2001 | Syllaios et al. |

(Continued)

FOREIGN PATENT DOCUMENTS

| CN | 1284162 A | 2/2001 |
| CN | 101563591 A | 10/2009 |

(Continued)

OTHER PUBLICATIONS

Transmittal of International Preliminary Report on Patentability dated Sep. 21, 2017 for PCT/US2016/022023.
(Continued)

*Primary Examiner* — Brandi M Hopkins
*Assistant Examiner* — Janice M Soto
(74) *Attorney, Agent, or Firm* — Kevin E. West; Advent, LLP

(57) ABSTRACT

A temperature measurement footprint device, a mobile temperature measurement device, and a method for determining a temperature measurement footprint are described. In an implementation, a temperature measurement footprint device includes a thermopile configured to measure a temperature of an object; a camera configured to capture an image of the object, the camera disposed proximate to and in communication with the thermopile; and a light source configured to illuminate the object, the light source disposed proximate to and in communication with the thermopile and the camera.

16 Claims, 2 Drawing Sheets

Related U.S. Application Data

(60) Provisional application No. 62/131,930, filed on Mar. 12, 2015.

(51) Int. Cl.
    *G01J 5/08* (2006.01)
    *G01J 5/00* (2006.01)

(58) Field of Classification Search
    CPC ........ G01J 5/0025; G01J 5/0265; G01J 5/089; G01J 2005/0081
    See application file for complete search history.

(56) References Cited

U.S. PATENT DOCUMENTS

| | | | | |
|---|---|---|---|---|
| 9,152,850 | B2* | 10/2015 | Mogi | G06K 9/00288 |
| 9,307,912 | B2* | 4/2016 | Mullin | H05K 13/00 |
| 2005/0105778 | A1* | 5/2005 | Sung | G06K 9/00255 |
| | | | | 382/115 |
| 2005/0201444 | A1 | 9/2005 | Hollander et al. | |
| 2006/0062275 | A1 | 3/2006 | Teng | |
| 2008/0165620 | A1 | 7/2008 | Sugiura | |
| 2009/0182526 | A1* | 7/2009 | Quinn | G01J 5/0003 |
| | | | | 702/131 |
| 2011/0112791 | A1* | 5/2011 | Pak | A61B 1/227 |
| | | | | 702/131 |
| 2011/0122251 | A1* | 5/2011 | Schmidt | G06K 9/2018 |
| | | | | 348/164 |
| 2013/0048855 | A1* | 2/2013 | Abreo | H04N 5/33 |
| | | | | 250/330 |
| 2013/0188058 | A1 | 7/2013 | Nguyen et al. | |
| 2013/0211766 | A1 | 8/2013 | Rosenberg et al. | |
| 2013/0230074 | A1* | 9/2013 | Shin | G01J 5/0025 |
| | | | | 374/129 |
| 2014/0046192 | A1 | 2/2014 | Mullin et al. | |
| 2014/0070078 | A1 | 3/2014 | Land et al. | |
| 2014/0152772 | A1* | 6/2014 | Feyh | G01J 5/0859 |
| | | | | 348/46 |
| 2014/0152970 | A1 | 6/2014 | Wada et al. | |
| 2014/0355649 | A1 | 12/2014 | Niederberger et al. | |
| 2015/0057561 | A1 | 2/2015 | Tal et al. | |
| 2015/0265159 | A1 | 9/2015 | Lane et al. | |
| 2015/0363928 | A1* | 12/2015 | Mestha | G01J 5/10 |
| | | | | 382/128 |

FOREIGN PATENT DOCUMENTS

| | | | |
|---|---|---|---|
| CN | 101839709 | A | 9/2010 |
| CN | 102706457 | A | 10/2012 |
| CN | 103188990 | A | 7/2013 |
| CN | 103250037 | A | 8/2013 |
| CN | 103282753 | A | 9/2013 |
| CN | 203287522 | U | 11/2013 |
| CN | 103565422 | A | 2/2014 |
| CN | 103732133 | A | 4/2014 |
| EP | 2487895 | A2 | 8/2012 |
| EP | 2659245 | | 11/2013 |
| JP | 2013200137 | A | 10/2013 |
| WO | WO-2012027739 | A2 * | 3/2012 ............... G01J 5/04 |
| WO | 2012067423 | | 5/2012 |
| WO | 2012092424 | | 7/2012 |

OTHER PUBLICATIONS

International Search Report and Written Opinion dated Jun. 21, 2016 for PCT/US2016/022023.
Office Action for Chinese Application No. 201680021507.2, dated Apr. 2, 2019.
Office Action for Chinese Application No. 201680021507.2, dated Dec. 26, 2019.
Office Action for Chinese Application No. 201680021507.2, dated Mar. 30, 2020.
Office Action for Chinese Application No. 201680021507.2, dated Aug. 3, 2020.

* cited by examiner

HEAT IMAGING THERMOPHILE DEVICE AND METHOD

CROSS-REFERENCE TO RELATED APPLICATIONS

The present application is a continuation-in-part under 35 U.S.C. § 120 of U.S. application Ser. No. 14/810,073, filed Jul. 27, 2015, entitled "DEVICE AND METHOD FOR TEMPERATURE CORRECTION USING A PROXIMITY SENSOR IN A NON-CONTACT THERMOPILE THERMOMETER." U.S. patent application Ser. No. 14/810,073 is herein incorporated by reference in its entirety.

BACKGROUND

A thermopile is an electronic device that converts thermal energy into electrical energy. It is composed of several thermocouples often connected in series or sometimes in parallel. Thermopiles do not respond to absolute temperature, but generate an output voltage proportional to a local temperature difference or a temperature gradient. The output voltage of a thermopile can be in the range of tens or hundreds of millivolts. As well as increasing the signal level, a thermopile device may be used to provide spatial temperature averaging. A thermopile can also be used to generate electrical energy from, for instance, heat from electrical components, solar wind, radioactive materials, or combustion.

SUMMARY

A temperature measurement footprint device, a mobile temperature measurement device, and a method for determining a temperature measurement footprint are described. In an implementation, a temperature measurement footprint device includes a thermopile configured to measure a temperature of an object; a camera configured to capture an image of the object, the camera disposed proximate to and in communication with the thermopile; and a light source configured to illuminate the object, the light source disposed proximate to and in communication with the thermopile and the camera.

In an implementation, a mobile temperature measurement device in accordance with the present disclosure includes a thermopile configured to measure a temperature of an object; a camera configured to capture an image of the object, the camera disposed proximate to and in communication with the thermopile; a light source configured to illuminate the object, the light source disposed proximate to and in communication with the thermopile and the camera; a user interface; and a controller communicatively coupled to the thermopile, the camera, the light source, and the user interface, the controller configured to cause measurement of the temperature of the object using the thermopile; initiation of the camera to capture the image of the object; activation of the light source to illuminate the object; initiation of the camera to capture a second image of the object while the light source is simultaneously illuminating the object; comparison of the image and the second image and determination of a temperature measurement footprint; and presentation of the temperature measurement footprint to the user interface.

In an implementation, a method for determining a temperature measurement footprint includes measuring a temperature of an object using a thermopile; initiating a camera to capture an image of the object; activating a light source to illuminate the object; initiating the camera to capture a second image of the object while the light source is simultaneously illuminating the object; using a controller to compare the image and the second image and determine a temperature measurement footprint, where the controller is communicatively coupled to the thermopile, the camera, and the light source; and presenting the temperature measurement footprint to a user interface. The temperature measurement footprint device, mobile temperature measurement device, and method for determining a temperature measurement footprint provides to a device user an indication of an area where a temperature is being measured on an object (e.g., the measurement footprint, the thermopile footprint).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Figure 1A:
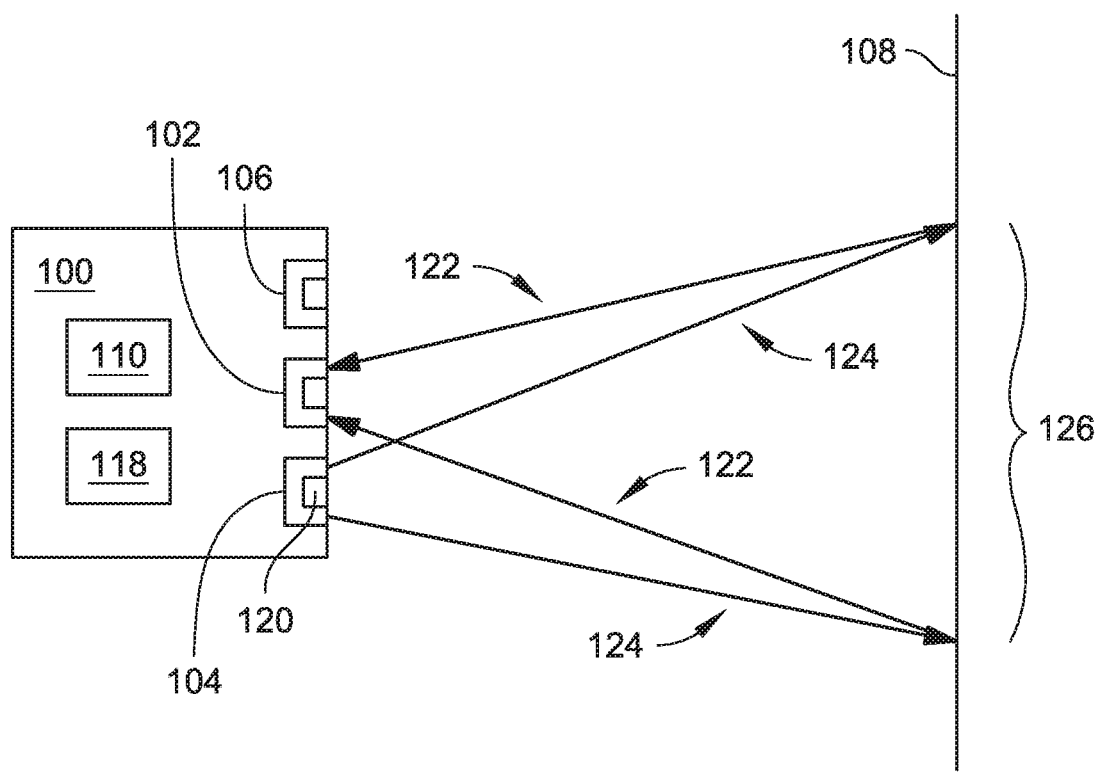
FIG. 1A is an environmental view illustrating a temperature measurement footprint device for providing a temperature measurement footprint, in accordance with an example implementation of the present disclosure.

Many devices use infrared radiation to measure an object's temperature, such as a thermographic camera, a thermal imaging camera, or an infrared camera. An infrared camera can include a device that forms an image using infrared radiation similar to a common camera, which forms an image using visible light. Instead of operating in the normal 450-750 nm range of a visible light camera, an infrared camera operates in wavelengths as long as 14,000 nm. The use of an infrared camera is useful in many applications. However, infrared cameras can be bulky and expensive.

Accordingly, a temperature measurement footprint device, a mobile temperature measurement device, and a method for determining a temperature measurement footprint are described. In an implementation, a temperature measurement footprint device includes a thermopile configured to measure a temperature of an object; a camera configured to capture an image of the object, the camera disposed proximate to and in communication with the thermopile; and a light source configured to illuminate the object, the light source disposed proximate to and in communication with the thermopile and the camera.

In an implementation, a mobile temperature measurement device in accordance with the present disclosure includes a thermopile configured to measure a temperature of an object; a camera configured to capture an image of the object, the camera disposed proximate to and in communication with the thermopile; a light source configured to illuminate the object, the light source disposed proximate to and in communication with the thermopile and the camera; a user interface; and a controller communicatively coupled to the thermopile, the camera, the light source, and the user interface, the controller configured to cause measurement of the temperature of the object using the thermopile; initiation of the camera to capture the image of the object; activation of the light source to illuminate the object; initiation of the camera to capture a second image of the object while the light source is simultaneously illuminating the object; comparison of the image and the second image and determination of a temperature measurement footprint; and presentation of the temperature measurement footprint to the user interface.

In an implementation, a method for determining a temperature measurement footprint includes measuring a temperature of an object using a thermopile; initiating a camera to capture an image of the object; activating a light source to illuminate the object; initiating the camera to capture a second image of the object while the light source is simultaneously illuminating the object; using a controller to compare the image and the second image and determine a temperature measurement footprint, where the controller is communicatively coupled to the thermopile, the camera, and the light source; and presenting the temperature measurement footprint to a user interface. The temperature measurement footprint device, mobile temperature measurement device, and method for determining a temperature measurement footprint provides to a device user an indication of an area where a temperature is being measured on an object (e.g., the measurement footprint, the thermopile footprint).

Example Implementations

Figure 1B:
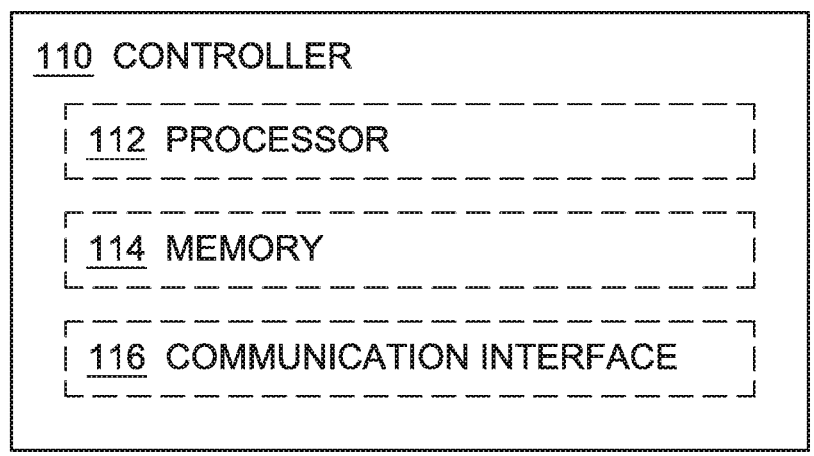
FIG. 1B is an environmental view illustrating an exemplary controller in the temperature measurement footprint device illustrated in FIG. 1A, in accordance with an example implementation of the present disclosure.

FIGS. 1A through 1B illustrate a temperature measurement footprint device 100 in accordance with an example implementation of the present disclosure. The temperature measurement footprint device 100 can include a thermopile 102, a light source 104, a camera 106, a controller 110, and/or a user interface 118. In implementations, the temperature measurement footprint device 100 may take on different forms, such as a mobile device and/or a smartphone, etc. In a specific example, the temperature measurement footprint device 100 can include a smartphone with capability to measure an individual's temperature. It is contemplated that the temperature measurement footprint device 100 may include other devices and forms. The temperature measurement footprint device 100 can be configured to be relatively small and mobile while providing an accurate temperature measurement footprint 126 and temperature measurement.

As illustrated in FIG. 1A, the temperature measurement footprint device 100 can include a thermopile 102. In implementations, a thermopile 102 can include an electronic device that converts thermal energy into electrical energy. For example, a thermopile 102 can include several thermocouples or temperature sensors connected in series or in parallel. In a specific embodiment, thermopile 102 can include a thermopile disposed proximate to a surface of the temperature measurement footprint device 100. In this embodiment, the thermopile 102 may be configured to detect a temperature of an object 108 that is external the temperature measurement footprint device 100 (e.g., a thermopile footprint). For example, the thermopile 102 can be configured to detect infrared radiation from an object 108, such as a human, an engine, a heater vent, and/or a furnace. In this example, the thermopile 102 and the temperature measurement footprint device 100 can be placed near the object 108 for detecting the infrared radiation. The temperature measurement footprint device 100 may be placed proximate to the object 108 at various distances depending on the object 108. In specific instances, the temperature measurement footprint device 100 may include a controller 110 configured to determine and present to a user an optimized distance.

As shown in in FIG. 1A, the temperature measurement footprint device 100 can include a light source 104. In implementations, light source 104 can include various types of illumination sources, such as a light-emitting diode (LED). The light source 104 can be configured to illuminate with transmitted light 124 (e.g., a light source footprint) at least part of an object 108 and indicate the area of the object 108 that the thermopile 102 is measuring (e.g., the thermopile footprint). The thermopile 102 and the light source 104 can be calibrated such that the temperature measurement footprint 126 is approximately the same area on the object 108 illuminated by light source 104 (e.g., the light source footprint). In one embodiment, the light source 104 for the temperature measurement footprint device 100 may be disposed adjacent to the thermopile 102 and/or a camera 106. In some embodiments, the light source 104 can be configured such that transmitted light 124 from the light source 104 can be transmitted through a pinhole or other aperture in the temperature measurement footprint device 100. In a specific embodiment, a light source 104 including an LED can transmit light (e.g., transmitted light 124) to illuminate a person's forehead. It is contemplated that the light source 104 can be configured to illuminate other types of objects 108. In specific embodiments, the light source 104 can include various colors, types, and/or combinations of light sources. For example, the light source 104 may include a red LED, a blue LED, a green LED, a yellow LED, an organic light-emitting diode (OLED), etc.

As shown in in FIG. 1A, the temperature measurement footprint device 100 can include a camera 106. A camera 106 can include an optical instrument that records an image. One example of a camera 106 can include a digital camera configured to detect reflected light 122 from object 108 and store an image created from the detected reflected light 122 as a digital image. For example, the camera 106 can detect ambient light and/or ambient light plus additional light (e.g., transmitted light 124). In one specific example, the camera 106 can include a digital camera 106 that is configured to detect a specific hue of an object 108 (or amount of illumination), such as a skin hue on a human. The camera 106 may be disposed within the temperature measurement footprint device 100 adjacent to a light source 104 and/or a thermopile 102. In implementations, the thermopile 102, the light source 104, and the camera 106 may be aligned and calibrated such that the light source 104 may illuminate a large area on the object 108 and/or only the temperature measurement footprint 126 (e.g., thermal image, temperature image) detected by the thermopile 102.

Referring to FIGS. 1A and 1B, a temperature measurement footprint device 100, including some or all of its components, can operate under computer control. For example, a processor 112 can be included with or in a temperature measurement footprint device 100 and/or controller 110 to control the components and functions of temperature measurement footprint device 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the temperature measurement footprint device 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The thermopile 102, light source 104, camera 106, and/or the user interface 118 can be coupled with a controller 110 for controlling the temperature measurement footprint device 100. The controller 110 can include a processor 112, a memory 114, and a communications interface 116. The processor 112 provides processing functionality for the temperature measurement footprint device 100/controller 110 and can include any number of processors, microcontrollers, or other processing systems, and resident or external memory for storing data and other information accessed or generated by the temperature measurement footprint device 100/controller 110. The processor 112 can execute one or more software programs that implement techniques described herein. The processor 112 is not limited by the materials from which it is formed or the processing mechanisms employed therein and, as such, can be implemented via semiconductor(s) and/or transistors (e.g., using electronic integrated circuit (IC) components), and so forth.

The controller 110 may include a memory 114. The memory 114 can be an example of tangible, computer-readable storage medium that provides storage functionality to store various data associated with operation of the temperature measurement footprint device 100/controller 110, such as software programs and/or code segments, or other data to instruct the processor 112, and possibly other components of the temperature measurement footprint device 100/controller 110, to perform the functionality described herein. Thus, the memory 114 can store data, such as a program of instructions for operating the temperature measurement footprint device 100 (including its components), and so forth. It should be noted that while a single memory 114 is described, a wide variety of types and combinations of memory (e.g., tangible, non-transitory memory) can be employed. The memory 114 can be integral with the processor 112, can comprise stand-alone memory, or can be a combination of both.

The memory 114 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the temperature measurement footprint device 100 and/or the memory 114 can include removable integrated circuit card (ICC) memory, such as memory provided by a subscriber identity module (SIM) card, a universal subscriber identity module (USIM) card, a universal integrated circuit card (UICC), and so on.

The controller 110 may include a communications interface 116. The communications interface 116 can be operatively configured to communicate with components of the temperature measurement footprint device 100. For example, the communications interface 116 can be configured to transmit data for storage in the temperature measurement footprint device 100, retrieve data from storage in the temperature measurement footprint device 100, and so forth. The communications interface 116 can also be communicatively coupled with the processor 112 to facilitate data transfer between components of the temperature measurement footprint device 100 and the processor 112 (e.g., for communicating inputs to the processor 112 received from a device communicatively coupled with the temperature measurement footprint device 100/controller 110). It should be noted that while the communications interface 116 is described as a component of a temperature measurement footprint device 100/controller 110, one or more components of the communications interface 116 can be implemented as external components communicatively coupled to the temperature measurement footprint device 100 via a wired and/or wireless connection. The temperature measurement footprint device 100 can also comprise and/or connect to one or more input/output (I/O) devices (e.g., via the communications interface 116), including, but not necessarily limited to: a display, a mouse, a touchpad, a keyboard, and so on.

The communications interface 116 and/or the processor 112 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 116 can be configured to communicate with a single network or multiple networks across different access points.

Generally, any of the functions described herein can be implemented using hardware (e.g., fixed logic circuitry such as integrated circuits), software, firmware, manual processing, or a combination thereof. Thus, the blocks discussed in this disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

As shown in in FIG. 1A, the temperature measurement footprint device 100 can include a user interface 118. In implementations, a user interface 118 can include a device configured to display information to a user. Some examples of a user interface 118 can include a display screen and/or a touch screen. In one specific embodiment, a user interface 118 can include a touch screen that is coupled to controller 110 and is configured to present information to a user, such as the field of view of the thermopile 102, a temperature of an object 108, a visual representation of a temperature measurement footprint (e.g., thermopile footprint), and/or the distance between the temperature measurement footprint device 100 and the object 108. In this specific embodiment, the touchscreen may also receive input from a user and transmit the input to the controller 110. In an additional specific embodiment, the user interface 118 can identify the object 108 (e.g., a user's identity using image analysis). In yet an additional embodiment, the user interface 118 can present positioning or distance information for positioning the temperature measurement footprint device 100 and optimizing the temperature footprint measurement 126.

In a specific embodiment, controller 110 can be configured to measure the temperature of the object using the thermopile, initiate the camera to capture the image of the object, activate the light source to illuminate the object, initiate the camera to capture a second image of the object while the light source is simultaneously illuminating the object, compare the image and the second image and determine a temperature measurement footprint 126, and present the temperature measurement footprint 126 to the user interface, where the controller is communicatively coupled to the thermopile, the camera, the user interface, and the light source.

In one specific embodiment, a temperature measurement footprint device 100 can include a thermopile 102, a light source 104 including an LED disposed proximate to a pinhole 120 through which transmitted light 124 from the LED passes, a camera 106 configured to detect reflected light 122 from an object 108 and create a digital image, a controller 110 configured to determine a temperature footprint measurement 126 using at least one digital image, and a user interface 118 configured to present a temperature footprint measurement 126.

Example Processes

Figure 2:
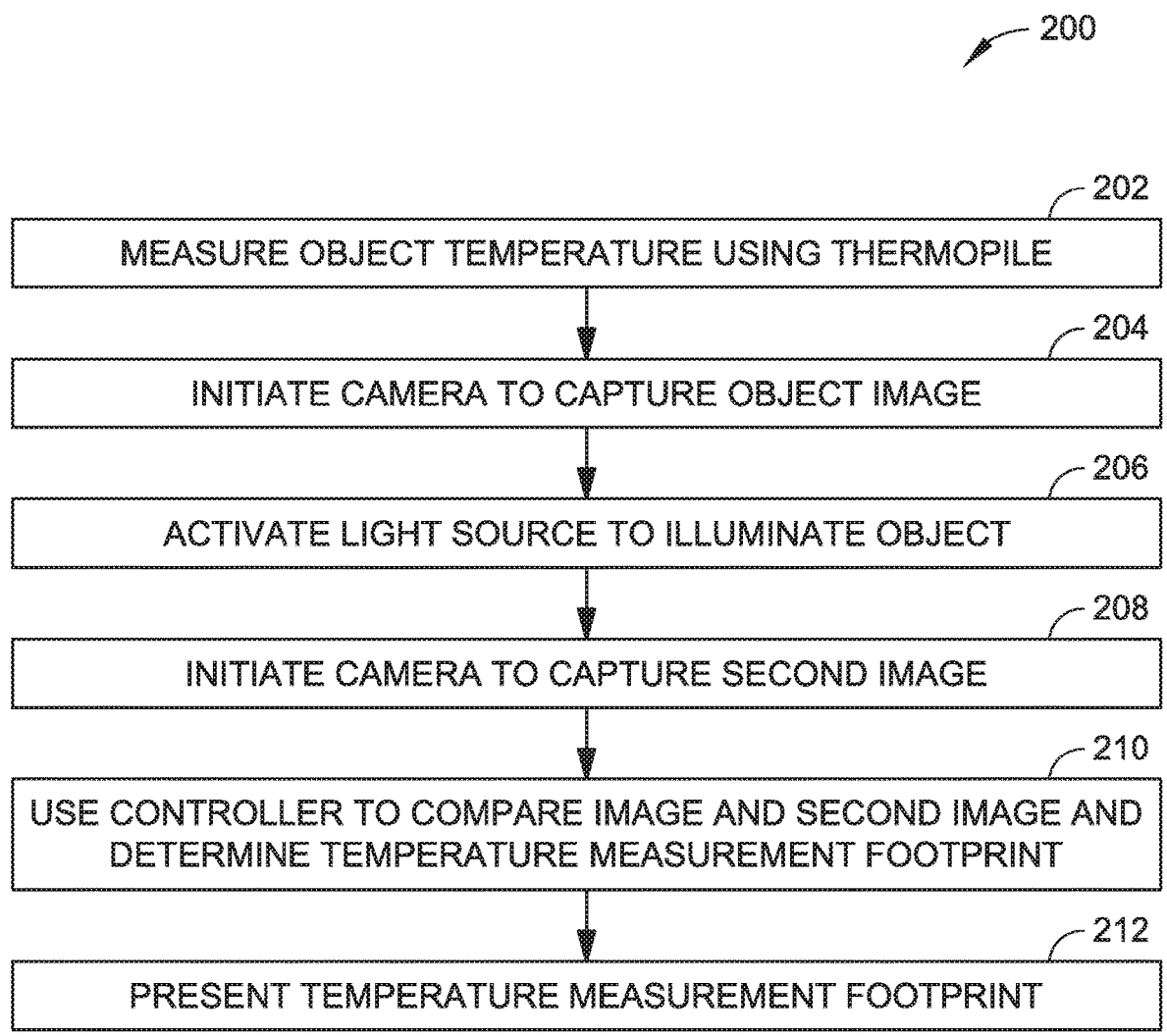
FIG. 2 is a flow diagram illustrating a process in an example implementation for using a temperature measurement footprint device, such as the temperature measurement footprint device shown in FIGS. 1A and 1B.

The following discussion describes example techniques for determining a temperature measurement footprint 126 using a temperature measurement footprint device, such as the temperature measurement footprint device 100 shown in FIGS. 1A and 1B. FIG. 2 depicts an example process 200 for determining a temperature measurement footprint 126.

As shown in FIG. 2, an object temperature is measured using a thermopile (Block 202). In implementations, measuring an object temperature can include using a thermopile 102 to detect infrared energy from the object 108. In embodiments, controller 110 can cause the thermopile 102 to detect the energy. The thermopile 102 can be configured to detect the infrared energy and transmit the resulting signal to controller 110. In one specific implementation, a user can initiate the thermopile 102 by inputting information into the temperature measurement footprint device 100 using a user interface 118. The thermopile 102 can be configured to detect infrared radiation from a variety of distances, such as from a person that is near (e.g., one foot) or distant (e.g., 50 feet) from the temperature measurement footprint device 100.

A camera is initiated for capturing an image of the object (Block 204). In an implementation, initiating a camera 106 can include initiating the camera 106 when the thermopile 102 is initiated for measuring an object's temperature. In this implementation, initiating the camera 106 can include capturing an image (e.g., a hue) of the object 108. Initiating the camera 106 can include transmitting the image to controller 110.

Then, a light source is activated to illuminate the object (Block 206). In implementations, activating the light source 104 can include using the light source 104 to briefly illuminate the object 108. The light source 104 may be configured to illuminate the light source 104 for a predetermined duration. Using the light source 104 to illuminate the object 108 may include transmitting light (e.g., transmitted light 124) in a conical configuration to a portion of the object 108 where the thermopile 102 has measured and/or is simultaneously measuring an object's temperature by detecting infrared radiation. Other illumination configurations may also be utilized. Controller 110 may cause the light source 104 to illuminate the object 108.

Then, the camera is initiated to capture a second image of the object (Block 208). Continuing in the above implementation, initiating the camera 106 to capture a second image of the object 108 can include capturing the second image while the light source 104 is illuminating the object 108. In this implementation, controller 110 can cause the camera 106 to capture a hue of the object 108, and camera 106 may be configured to transmit the second image to controller 110.

The controller is then used to compare the image and the second image and determine a temperature measurement footprint (Block 210). In implementations, the image and the second image captured by the camera 106 can be compared using controller 110. The comparison of the image and the second image can include a determination of a change in hue of the object 108 between the first image and the second image, which can indicate a temperature measurement footprint 126. The first image captured by the camera 106 may represent ambient light reflected by the object 108. The second image captured by the camera 106 may represent ambient light reflected by the object 108 as well as reflected light 122 from light source 104. The change in reflected light 122 (e.g., light amount, hue, etc.) between the first image and the second image can indicate the area of the object 108 where the thermopile 102 measured a temperature such that controller 110 can determine a temperature measurement footprint 126.

Then, the temperature measurement footprint is presented to a user interface (Block 212). In implementations, presenting the temperature measurement footprint 126 to a user interface 118 can include using controller 110 to present the temperature measurement footprint 126 and/or other information (e.g., thermopile 102 field of view, temperature information, distance information between the temperature measurement footprint device 100 and the object 108, etc.) to the user interface 118, such as a display disposed within the temperature measurement footprint device 100.

In a specific embodiment, determining a temperature measurement footprint 126 may include using controller 110 to construct a temperature profile for an object 108. In this embodiment, the controller 110 can determine a temperature and corresponding temperature measurement footprint 126 for a specific area of an object 108. The controller 110 can then combine multiple temperature measurement footprints for different areas of the object 108 to create an object's temperature profile. In some instances, the controller 110 can superimpose the object's temperature profile onto an image of the object 108 (e.g., in some instances camera 106 can be capable of capturing the image and transmitting the image to controller 110) and/or present the image and superimposed temperature profile to a user interface 118. In a specific example, a controller 110 can determine a temperature and corresponding temperature measurement footprint 126 for a specific area of an engine using thermopile 102, light source 104, and/or camera 106. The controller 110 can then combine multiple temperature measurement footprints 126 for different areas of the engine to create an engine temperature profile. The engine temperature profile can then be superimposed on an image of the engine and presented to a user interface 118 including a touch screen. In this specific example, the controller 110 can also present the temperatures of selected temperature measurement footprints 126.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A mobile temperature measurement device, comprising:
   a thermopile configured to measure a temperature of an object at a first area on the object while located at a distance from the object, the measured temperature within the first area on the object defining a temperature measurement footprint of the object;
   a camera configured to capture an image of the object, the camera disposed proximate to the thermopile;
   a light source configured to illuminate a second area on the object, the light source disposed proximate to the thermopile and the camera, wherein the second area on the object is defined as a light source footprint on the object, the light source and the thermopile being calibrated such that the first area on the object is coextensive with and approximately a same size as the second area on the object;
   a user interface; and
   a controller communicatively coupled to the thermopile, the camera, the light source, and the user interface, the controller configured to cause:
   initiation of the thermopile to measure the temperature of the object within the first area on the object;
   activation of the light source to illuminate the second area on the object;
   initiation of the camera to capture an image of the object while the light source is simultaneously illuminating the second area on the object; and
   presentation by the user interface of the temperature measurement footprint superimposed on the image within the second area on the object.

2. The mobile temperature measurement device of claim 1, wherein the camera includes a CMOS image sensor.

3. The mobile temperature measurement device of claim 1, wherein the light source includes a light-emitting diode.

4. The mobile temperature measurement device of claim 1, wherein the mobile temperature measurement device includes a mobile device.

5. The mobile temperature measurement device of claim 4, wherein the mobile device includes a smartphone.

6. The mobile temperature measurement device of claim 1, wherein the controller is further configured to cause:
   determination of an optimized distance of the thermopile to the object for measurement of the temperature of the first area on the object; and
   provision of the optimized distance to the user interface to allow the thermopile to be located at a distance equal to the optimized distance.

7. The mobile temperature measurement device of claim 1, wherein the controller is further configured to cause:
   initiation of the camera to capture an additional image of the object; and
   comparison of the image and the additional image to determine the light source footprint of the object, the comparison based on a difference in reflected light between the image and the additional image.

8. A method for determining a temperature measurement footprint, comprising:
   measuring a temperature of a first area on an object using a thermopile located at a distance from the object, the first area on the object being defined as a temperature measurement footprint of the object;
   initiating a camera to capture a first image of the object;
   activating a light source to illuminate a second area on the object, the second area on the object being defined as a light source footprint on the object and wherein the light source and the thermopile are calibrated such that the second area on the object is coextensive with and approximately a same size as the first area on the object;
   initiating the camera to capture a second image of the object while the light source is simultaneously illuminating the second area on the object;
   comparing the first image and the second image to determine the light source footprint on the object; and
   causing a user interface to present the temperature measurement footprint including measurement of the temperature of the first area on the object superimposed on the second area on the object.

9. The method for determining the temperature measurement footprint in claim 8, where presenting the temperature measurement footprint to the user interface includes presenting at least one of a temperature measurement footprint visual representation, an object temperature, a distance between the object and the temperature measurement footprint device, or a field of view of the thermopile.

10. The method for determining the temperature measurement footprint in claim 8, further comprising:
    determining a temperature profile of the object.

11. The method for determining the temperature measurement footprint in claim 8, wherein the camera includes a CMOS image sensor.

12. The method for determining the temperature measurement footprint in claim 8, wherein the light source includes a light-emitting diode.

13. The method for determining the temperature measurement footprint in claim 8, wherein a device used for determining the temperature measurement footprint includes a mobile device.

14. The method for determining the temperature measurement footprint in claim 13, wherein the mobile device includes a smartphone.

15. The method for determining the temperature measurement footprint in claim 8, further comprising:
   determining of an optimized distance of the thermopile to the object for measurement of the temperature of the first area on the object; and
   providing the optimized distance to the user interface to allow the thermopile to be located at a distance equal to the optimized distance.

16. The method for determining the temperature measurement footprint in claim 8, wherein the step of comparing the first image and the second image to determine the light source footprint of the object includes a comparison based on a difference in reflected light between the first image and the second image.

\* \* \* \* \*